United States Patent [19]

Atkinson

[11] 4,011,612
[45] Mar. 15, 1977

[54] COMBINATION LAWN AND GARDEN IMPLEMENT

[75] Inventor: Wallace E. Atkinson, Petersburg, Va.

[73] Assignee: Long Manufacturing Co., Inc., Petersburg, Va.

[22] Filed: Dec. 29, 1975

[21] Appl. No.: 645,032

[52] U.S. Cl. .................... 7/14.55; 7/1 L; 111/92; 172/375; 56/400.06
[51] Int. Cl.² .................. B25F 1/00; H01B 49/04
[58] Field of Search .......... 7/1 L, 14.55; 56/400.04, 400.06; 172/375, 377, 378, 381; 111/92, 94, 95, 96, 97, 98

[56] References Cited

UNITED STATES PATENTS

| | | | |
|---|---|---|---|
| 133,709 | 12/1872 | Jones | 111/92 |
| 365,108 | 6/1887 | Trabue | 111/95 |
| 1,105,674 | 8/1914 | Lytle, Jr. | 111/92 |
| 2,611,514 | 9/1952 | Peyton | 111/92 |
| D27,173 | 6/1897 | Steel | 172/375 |
| D203,125 | 12/1965 | Gouveia | 172/375 |

FOREIGN PATENTS OR APPLICATIONS

| | | | |
|---|---|---|---|
| 1,212,421 | 10/1959 | France | 172/375 |
| 128,874 | 7/1950 | Sweden | 172/375 |

*Primary Examiner*—Al Lawrence Smith
*Assistant Examiner*—Roscoe V. Parker
*Attorney, Agent, or Firm*—Mason, Fenwick & Lawrence

[57] ABSTRACT

A combination lawn and garden implement having a hollow elongated handle provided with a furrow forming and closing tool on one end shaped to form a furrow in the soil or close the furrow when used in a furrowing mode with the user in the standing position and shaped to define a trough to receive and guide seeds into the handle for discharge therethrough into a furrow when used in a planting mode. Various changeable tool attachments are provided for the other end of the handle to perform a variety of gardening and lawn working functions.

10 Claims, 12 Drawing Figures

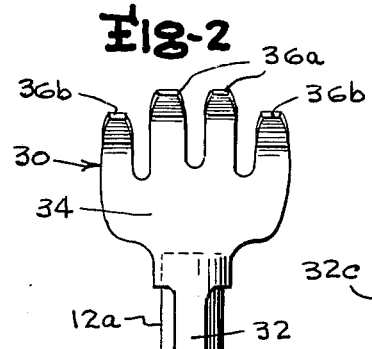
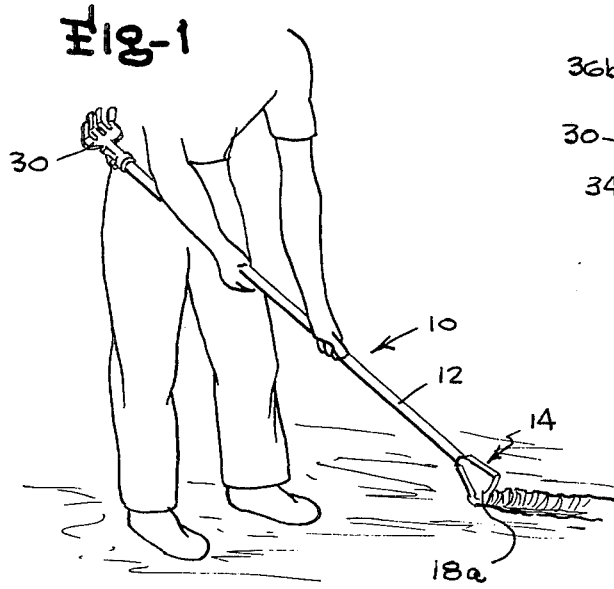
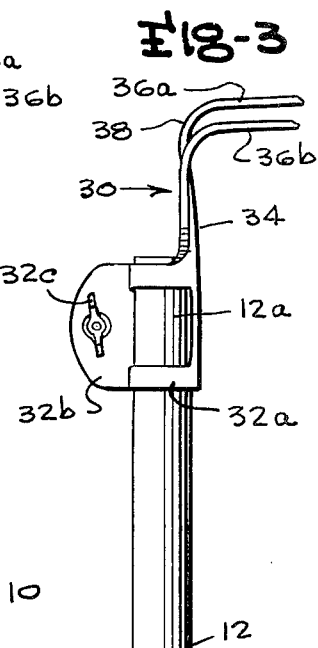
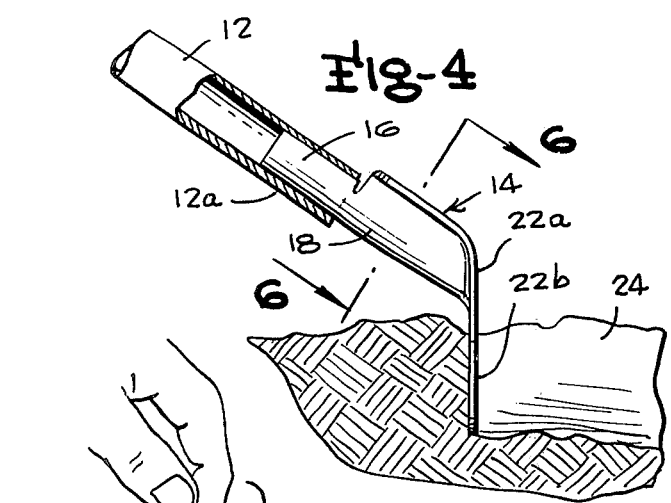
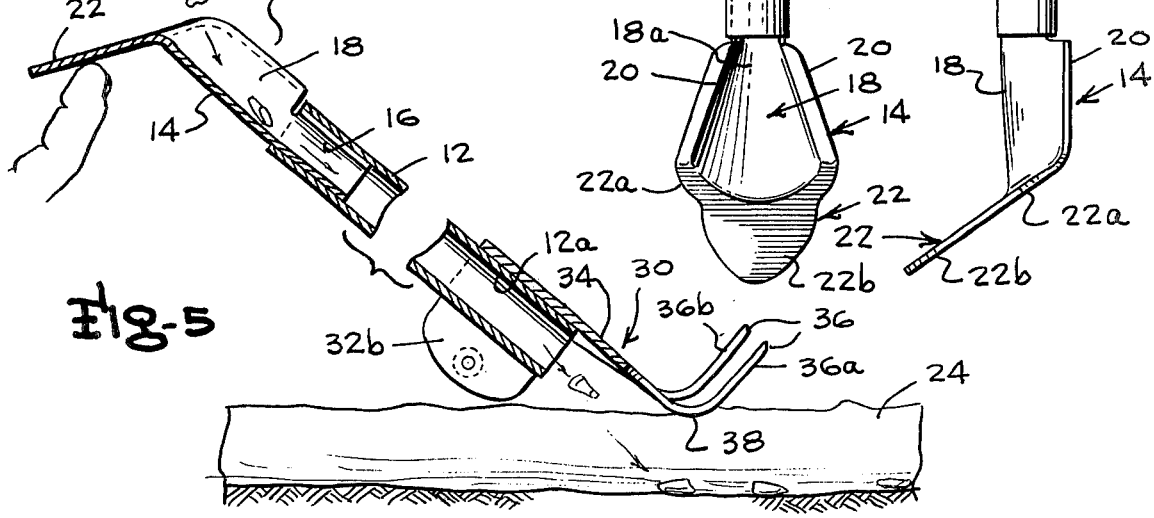

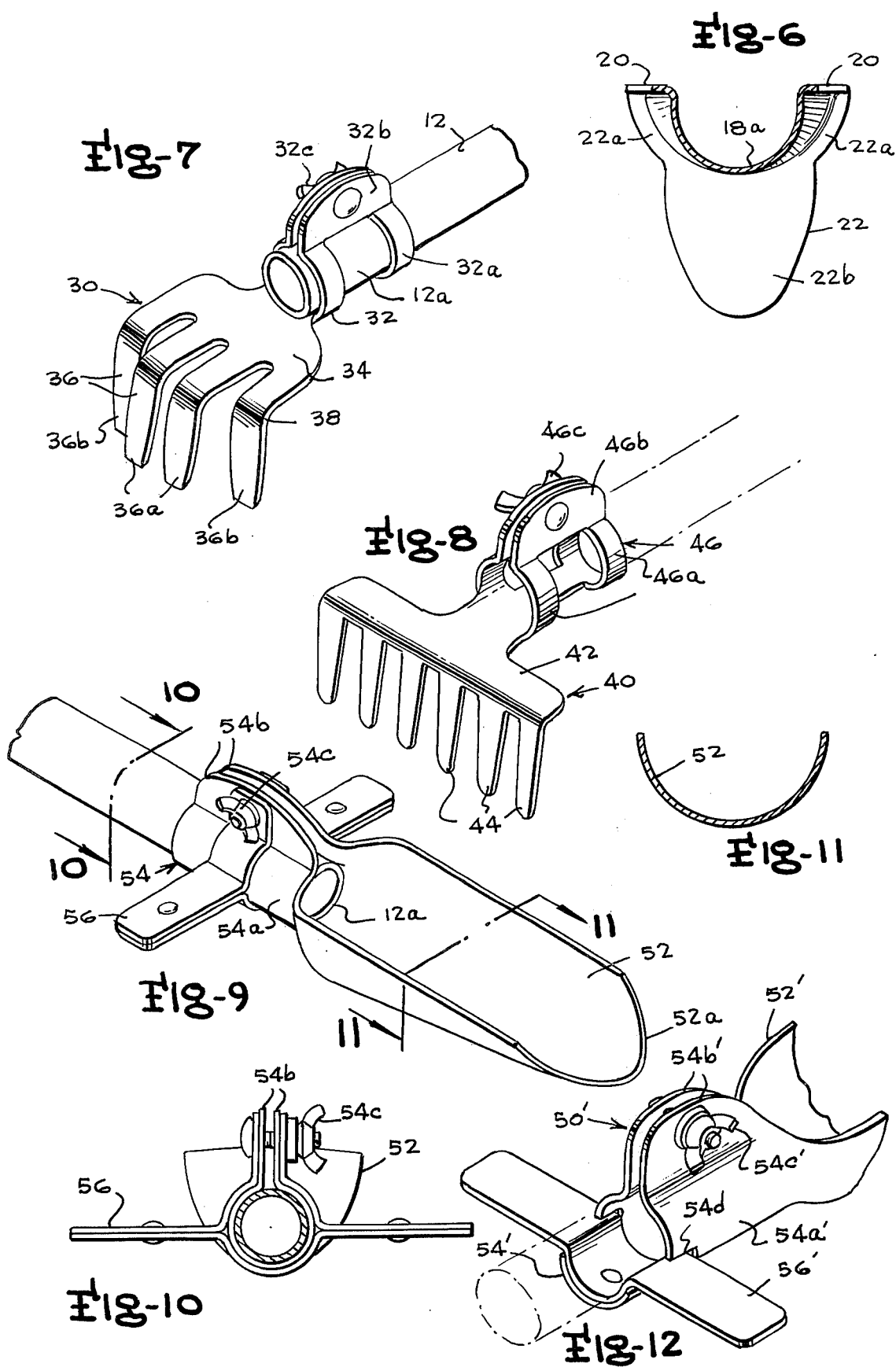

COMBINATION LAWN AND GARDEN IMPLEMENT

BACKGROUND AND OBJECTS OF THE INVENTION

The present invention relates in general to combination lawn and garden implement or tool structures, and more particularly to a combination lawn and garden implement set structured to provide a furrow-forming and closing tool on one end of a hollow elongated handle to facilitate forming and closing of garden furrows and shaped to also provide a funnel-like trough for receiving seed when the implement is used in a seed planting mode, and having changeable tool attachments for the other end providing a cultivator attachment shaped to facilitate depositing seeds in a furrow and which may be used to close furrows, a small rake attachment, and a digging, weeding and hole-filling attachment for bulb planting, weeding and filling, and like operations.

Heretofore, a variety of gardening tools, lawn tools, and planting tools have been devised, each in most cases having a specialized function, so that a large number of such tools are required to perform various gardening, planting, cultivating weeding, and lawn work operations. A common practice is to design such tools so that they are highly specialized to a particular one of the required gardening or lawn working functions rather than providing an implement construction whereby a large number of such functions can be readily performed with a single implement.

An object of the present invention is the provision of a novel lawn and garden implement construction which provides the capability of performing a wide variety of lawn and garden working functions and which is of relatively inexpensive, durable construction capable of long and reliable use.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of the novel lawn and gardening implement construction of the present invention shown in use as a furrow-forming implement;

FIG. 2 is a front elevation view of the combination lawn and garden implement arranged with the concave funnel-shaped trough portion of the furrow-forming tool head confronting the viewer;

FIG. 3 is a side elevation view of the combination lawn and garden implement, viewed from the right of FIG. 2;

FIG. 4 is a fragmentary side elevation view of the furrow-forming tool head end of the implement in a normal attitude of use for forming a furrow, with portions of the hollow handle broken away;

FIG. 5 is a vertical section view through the combination lawn and garden implement showing the implement in the attitude normally occupied for planting seeds in a prepared furrow;

FIG. 6 is a transverse section view through the furrow-forming tool head, taken along the line 6—6 of FIG. 4;

FIG. 7 is a fragmentary perspective view of the cultivator tool attachment for the end of the handle opposite the furrow-forming head;

FIG. 8 is a fragmentary perspective view of the miniature rake attachment for the end of the handle opposite the furrow-forming tool, which may be used with the combination implement construction;

FIG. 9 is a fragmentary perspective view of the digging scoop and weeding attachment which may be assembled on the end of the handle opposite the furrow-forming end;

FIG. 10 is a section view taken from the line 10—10 of FIG. 9, showing the digging scoop and weeding attachment from the upper end thereof;

FIG. 11 is a transverse section view through the concave cylindrical portion of the scoop taken along the line 11—11 of FIG. 9; and FIG. 12 is a fragmentary perspective view of the upper or mounting end portion of a modified scoop attachment.

DETAILED DESCRIPTION OF A PREFERRED EMBODIMENT

Referring to the drawings, wherein like reference characters designate corresponding parts throughout the several figures, the combination lawn and garden implement construction of the present invention, indicated generally by the reference character 10, comprises an elongated hollow handle 12 which, for example, is made of hollow cylindrical metallic tubing, such as aluminum tubing, which may be about one inch or one and a quarter inches in diameter and a length from end to end of the tube appropriate so that the furrow-forming head, indicated generally by the reference character 14, may be positioned substantially as illustrated in FIGS. 1 and 4 without the user having to bend or stoop to a position which would bring on backache or back muscular fatigue. In one satisfactory example, the length of the hollow tubular handle 12 is about 42 inches from one end to the other of the tubular portion. Fixed to the lower end of the tubular handle 12 as viewed in FIGS. 1, 2 and 3 is the furrow-forming tool or fixture 14 formed, in one satisfactory example, by stamping and bending sheet metal stock to provide a hollow cylindrically configurated mounting shank portion 16 which is telescopically received in the bore of the hollow tubular handle 12 as illustrated in FIGS. 4 and 5 and may be fixed therein in any suitable manner, for example by a single rivet. The portion of the furrow-forming fixture 14 protruding from the hollow handle 12 comprises an outwardly flaring or tapered convex trough formation 18 defining an upwardly opening concave trough, when viewed from the top with the implement in the position of FIGS. 1, 4 or 5, which trough is of substantially the configuration of a truncated half cone terminating along its upper longitudinal edges by oppositely outwardly flaring flanges or lips 20 disposed in a plane paralleling the longitudinal center axis of the tubular handle 12. The outer end of the concave trough portion of the furrow-forming tool 14 terminates in a lip formation 22 best shown in FIGS. 2 and 6 having upper portions 22a immediately adjoining the oppositely projecting side flanges 20 and extending along a portion of the bottom curved wall 18a of the trough portion having a substantially uniform flange width and merging into a downwardly extending rounded nose formation or rounded furrowing point 22b having a transverse profile when disposed in the position of FIG. 4 corresponding substantially to the cross-sectional shape of the desired furrow, as seen in FIG. 6. The working end flange formation defined by the furrow shaped projection or rounded point portion 22b and the upper portions 22a lie in a single plane disposed transverse to the extended center axis of the tubular handle 12 and disposed at an angle of about 45° to that extended axis, so that when the furrow-forming end of the implement is held in the position shown in FIG. 4 and is drawn to the left as viewed in that figure, with the furrow-forming projection or rounded point portion 22b penetrating into the soil the desired depth, a furrow such as indicated at 24 will be readily formed in the soil.

After the furrow has been formed in the prepared garden plot, which preferably has already been worked to suitably loosen the soil, the implement is then inverted to the position illustrated in FIG. 5, wherein the furrow-forming tool or fixture 14 is located at the upper end of the handle 12 with the concave trough portion 18 still facing upwardly, and the opened lower end of the handle 12 is disposed just above the furrow 24 which has been formed in the soil, whereupon the seeds to be planted can be merely manually dropped into the upwardly opening trough formation 18 and will be guided down the hollow handle 12 and deposited in the freshly formed furrow 24 as the implement is drawn along the furrow.

To facilitate the proper location of the seed discharging end of the handle 12 immediately above and generally centered relative to the furrow when using the implement in the seed planting mode, the cultivator attachment 30 is preferably removably assembled to the hollow cylindrical end portion 12a of the handle, which is the upper end of the handle 12 as viewed in FIGS. 2 and 3 and is the lower end of the handle as viewed in FIG. 5. The concavely curved trough portion 18 of the furrow-forming fixture 14 in this seed planting mode or position of the implement is contoured to comfortably fit the hand of the user as he guides the implement along and above the furrow in substantially the inclined position shown in FIG. 5, and the cultivator attachment comprises a mounting clamp formation 32 assembled to the end 12a of the handle 12 and a laterally or transversely enlarged approximately flat or very slightly curved body portion 34 from which four cultivating fingers or tines 36 project which are joined to the body portion 34 by curved root portions 38. The two centermost cultivating tines or fingers 36a extend somewhat further from the mounting clamp formation 32 than the two edgemost or lateral flanking tines or fingers 36b as shown, whereby the curved root portions 38 of the centermost tines 36a may protrude slightly into the furrow 24 when the implement is in the FIG. 5 position while the curved root portions of the lateral flanking tines 36b ride on the rim or slightly outwardly of the edges of the furrow 24. This tends to assist in keeping the lower discharge end 12a of the handle 12 properly centered over the furrow 24 while the body or palm portion 34 of the cultivator provides a surface overlying the space where the seeds are dropping into the furrow to keep the seeds from bouncing out of proper location in the furrow or from bouncing out of the furrow altogether. In other words, the cultivator attachment 30 when used in the manner illustrated in FIG. 5 serves in effect as a sort of sled or drag guide for the end of the handle through which the seeds are being discharged to locate that end of the handle in the seed planting mode and also retard unwanted bouncing of the seeds out of position. The particular form of the mounting clamp portion 32 as illustrated in FIGS. 2, 3 and 7, in the illustrated embodiment, comprises an easy on-off, quick tightening clamp providing a pair of curved clamp jaws 32a shaped to encircle the cylindrical tubular end 12a of the handle and having flat parallel ear formations 32b apertured to receive a bolt and wing nut 32c by which the clamping jaws can be drawn to tightly embrace the adjacent portion of the handle 12 and rigidly fix the cultivator 30 on the end of the handle.

After depositing the seeds in the furrow by dropping them into the trough portion 18 of the furrow-forming fixture 14 and allowing them to pass downwardly through the hollow tubular handle 12, the furrow can then be closed to cover the seed by rotating the implement about the handle axis through 180° so that the cultivator tines 36 extend downwardly and the cultivator may then be used in the normal manner to rake soil into the furrow, or the implement can be re-oriented to return the fixture 14 to the lower position and the flange portion 22 used to close the furrow.

The implement can also be used as a rake for raking in narrow places such as in crowded flower beds and the like, by replacing the cultivator attachment 30 with the mini-rake attachment 40 of the construction illustrated in FIG. 8 having a laterally enlarged transverse bar portion 42 from which usual rake teeth 44 depend and having a mounting clamp formation 46 which is substantially identical to the mounting clamp formation 32 of the cultivator fixture. The mounting clamp formation 46, like the formation 32 of the cultivator attachment 30, has the pair of laterally spaced outwardly curving legs 46a terminating at the top in ear formations 46b through which the wing nut and bolt assembly 46c extend, thereby providing quick tightening clamp formations whereby the cultivator attachment 30 can be readily removed and the rake attachment 40 quickly assembled onto the handle 12.

A scoop attachment 50, illustrated in FIGS. 9, 10 and 11, is also provided to be assembled on the end 12a of the hollow tubular handle 12 when desired, to serve a large variety of digging, weeding and planting functions and the like. The scoop attachment 50 is also formed of sheet metal and comprises a contoured half round scoop formation 52 of upwardly concave configuration, the curvature of which is illustrated in FIG. 11, which may be about 5 and a half inches long, in one example, from the end of the hollow tubular handle 12 when assembled thereon to the rounded blunt digging edge 52a at the working end of the scoop formation 52. The scoop formation is provided with slightly tapered sides for easy entrance into the soil and at its upper or rearmost end merges along curved paths into a mounting clamp formation 54 providing outwardly curving, laterally spaced sides 54a serving a function similar to the legs 46a and 32a of the mounting formation 46 and 32 of the cultivator and rake attachments, to encircle the end 12a of the handle 12 and terminate in ear formations 54b through which the wing nut and bolt assembly 54c extends to provide a quick tightening clamp like those of the rake and cultivator attachments. The scoop portion 52 is contoured to be deep enough to serve as a scoop and yet allow easy dirt removal, it is provided with deep tapered side walls for strength and ease of dirt removal, it terminates in a contoured lower working end 52a contoured to enter the soil easily and yet allow loose soil and dirt to be easily removed from the scoop and to facilitate removal of soil from holes by tilting and lifting the handle of the implement. A transverse foot bar 56 is attached to the mounting clamp portion of the scoop attachment near its upper end, forming a cross bar against which the foot may be pushed to facilitate digging with the scoop attachment. In the embodiment illustrated, the foot bar 56 is formed of two metallic strap members riveted together and shaped to outwardly encircle and conform to the contour of the curved sides 54a of the mounting clamp formation 54 and having extensions which are in outwardly overlapping contact with the center portions of the mounting ears 54b apertured to receive the shank of the wing nut and bolt assembly 54c therethrough. In the illustrated embodiment, the foot crossbar 56 may be merely held in position by the tight frictional contact between the curved outer surfaces of the sides 54a of the mounting clamp formation 54 and the outwardly embracing curved portions of the foot crossbar when the wing nut 54c has been tightened to assemble the attachment 50 onto the handle 12, or spot welding may be additionally employed to assist in holding the foot piece in position on the scoop attachment. Instead of mounting the crossbar 56 in the manner illustrated in FIGS. 9 and 10, the crossbar forming the foot bar may be formed from a single metallic bar member shaped like the lower crossbar component 56a of the assembled pair of crossbar strap members 56a and 56b of FIG. 10, having a half round semicylindrical midportion like the member 56a but having an inner diameter conforming to the outer diameter of the tubular handle 12, with the half round midportion inwardly underlying and riveted to a correspondingly contoured semicylindrical upper end portion of the mounting clamp formation 54' opposite the ear formations 54b' and extending for part of the width of the crossbar into diametrically opposite slots 54d in the upper edge portion of the curved sides 54a' sized to just accommodate and abut the edges of the foot crossbar extending into such slots. A fragmentary perspective view of such a modified scoop attachment upper end portion is shown in FIG. 12.

It will be apparent that the scoop attachment provides a convenient tool for digging weeds, wild onions and similar unwanted plants from lawns and gardens, the scoop may be employed to cut grass plugs or form round holes for planting bulbs or removing small plants by forcing the scoop into the soil to cut a first half circle on one side of the plant of plug or bulb site and then repeating on the other side of the site to form another half circle completing the circle being cut by the scoop portion, and then removing the grass plus or soil within the circle by tilting and lifting the scoop portion.

What is claimed is:

1. A lawn and garden implement comprising an enlongated hollow tubular handle having first and second opposite open ends, a furrowing tool fixed onto said first open end shaped to define a concavely curved trough portion extending outwardly from said first end and terminating in a generally planiform toe flange inclined to the longitudinal axis of the handle and shaped to a predetermined furrow contour to form a furrow in the soil when the implement is drawn over the soil with said first end down and the handle disposed in a first inclined position locating the toe flange in downwardly extending generally vertical relation from the handle axis, the concavely curved trough having an open throat portion communicating with the bore of the hollow handle at said first end whereby the trough portion may be disposed in upwardly facing inclined relation to receive seeds and guide them into the hollow tubular handle for gravitational movement therethrough and discharge into a furrow in the soil from said second end when the implement is in predetermined second inclined position with said second end down, and the length of said handle being such as to enable the user to manipulate the furrowing toe flange in the soil from a standing position.

2. A lawn and garden implement as defined in claim 1, wherein said concavely curved trough flares outwardly with progressively increasing radius from said first end along a generally truncated conical path substantially concentric with the handle axis.

3. A lawn and garden implement as defined in claim 1, wherein said concavely curved trough flares outwardly with progressively increasing radius from said first end along a generally truncated conical path substantially concentric with the handle axis and said toe flange being of generally rounded triangular shape to form a furrow with downwardly convergent sides.

4. A lawn and garden implement as defined in claim 1, including an earth working tool mounted on said second end of said handle having a wall portion extending beyond said second end disposed to overlie the region immediately outwardly and above the opening in said second end when the implement occupies said second inclined position discharging seeds in a furrow to provide a barrier wall for minimizing bouncing of seeds from the furrow.

5. A lawn and garden implement as defined in claim 1, including a cultivator tool mounted on said second end of said handle having a plurality of cultivator tines curving from a wall portion extending beyond said second end disposed to overlie the region immediately outwardly and above the opening in said second end when the implement occupies said second inclined position discharging seeds in a furrow to provide a barrier wall for minimizing bouncing of seeds from the furrow.

6. A lawn and garden implement as defined in claim 1 including a cultivator tool mounted on said second end of said handle having a plurality of cultivator tines curving from a wall portion extending beyond said second end disposed to overlie the region immediately outwardly and above the opening in said second end when the implement occupies said second inclined position discharging seeds in a furrow to provide a barrier wall for minimizing bouncing of seeds from the furrow, the cultivator tines including a center group of tines and outer tines laterally flanking the center group, the center group of tines joining the wall portion at a greater distance from said second end than said laterally flanking tines forming a center tine guide formation at the roots of said center group approximating the width of the top of a furrow formed with said toe flange to project slightly into the furrow with the root portions of the lateral flanking tines resting on the soil outwardly adjacent the furrow sides when the implement occupies said second inclined position and thereby facilitate centering of said second end over the furrow.

7. A lawn and garden implement as defined in claim 3, including an earth working tool mounted on said second end of said handle having a wall portion extending beyond said second end disposed to overlie the region immediately outwardly and above the opening in said second end when the implement occupies said second inclined position discharging seeds in a furrow to provide a barrier wall for minimizing bouncing of seeds from the furrow.

8. A lawn and garden implement as defined in claim 3, including a scoop attachment mounted on said second end of said handle having a mounting formation at one end surrounding and fixed to the adjacent handle end portion and an elongated concave scoop formation of substantially half-circular cross-section and rounded end extending outwardly of said one end from said first end generally concentric with the handle axis, and said scoop attachment including a rigid cross-bar member centrally fixed to the mounting formation and laterally protruding oppositely from the handle along a diametric plane thereof sufficient distances for the user's foot to engage and press downwardly thereon to assist in forcing the scoop into soil.

9. A lawn and garden implement as defined in claim 4, wherein said earth working tool is a rake attachment having a row of rake teeth projecting substantially perpendicularly from said wall portion.

10. A lawn and garden implement as defined in claim 4, wherein said earth working tool is a scoop attachment having an elongated concave scoop portion extending beyond the handle generally concentric with the axis of said handle and forming said wall portion.

* * * * *